March 4, 1969  C. J. CAMPAGNUOLO  3,430,895
AIRCRAFT CONTROL SYSTEM
Filed Oct. 21, 1966

INVENTOR,
CARL J. CAMPAGNUOLO
ATTORNEYS

United States Patent Office 3,430,895
Patented Mar. 4, 1969

3,430,895
AIRCRAFT CONTROL SYSTEM
Carl J. Campagnuolo, Chevy Chase, Md., assignor to the United States of America as represented by the Secretary of the Army
Filed Oct. 21, 1966, Ser. No. 588,640
U.S. Cl. 244—78                                       5 Claims
Int. Cl. B64c *13/40*

ABSTRACT OF THE DISCLOSURE

An aircraft control system for monitoring and correcting disturbances in the flight path of aircraft requiring no moving parts or electronic components. A vortex rate sensor detects the angular rate of pitch, roll or yaw and supplies a fluid signal indicative of that rate to a fluidic integrator. The integrated rate signal is amplified by being passed through a high frequency modulator, a low frequency modulator and a plurality of bistable amplifiers. The amplified signal is used to operate reaction jets to make the necessary correction.

---

The invention described herein may be manufactured, used, and licensed by or for the Government for governmental purposes without the payment to me of any royalty thereon.

This invention relates to an aircraft control system and in particular to an aircraft control system that can be used to monitor and eliminate pitch, roll and yaw, either individually or simultaneously, in an aircraft.

In foil supported aircraft systems it is important that constant measurements of aircraft disturbances such as pitch, yaw and roll be made so that a signal can be provided to some corrective means to eliminate these disturbances.

Prior art means to eliminate flight disturbances conventionally employed complex electronic devices. These devices, while adequate to eliminate aircraft disturbances, were quite expensive and because of their lack of dependability when subjected to vigorous vibrations, as would be found in supersonic aircraft, required extensive insulating means. It is obvious that any system that could be devised to control and eliminate aircraft disturbances and yet be inexpensive and withstand environmental vibrations without requiring expensive insulating means would find wide use.

It is therefore an object of the present invention to provide improved means to monitor and eliminate aircraft disturbances.

Another object of the present invention is to provide means to monitor and eliminate aircraft disturbances, said means not being adversely affected by environmental vibrations.

Briefly, the present invention utilizes pure fluid elements, which are not adversely affected by environmental vibrations, to monitor and eliminate disturbances such as pitch, roll and yaw of an aircraft. A rate sensor detects the angular rate of the pitch, roll or yaw and supplies a signal indicative of the rate to a pure fluid integrator. The integrator integrates the rate to give a signal indicative of the angular displacement the aircraft is subjected to. The signal from the integrator is amplified and used to control reaction jets to eliminate the aircraft disturbance. If it is desired to simultaneously eliminate disturbances such as pitch, roll and yaw, three sets of rate sensors are used to provide three signals indicative of pitch, roll and yaw, respectively. Each signal is amplified and supplied to a separate reaction jet which will correct the disturbance the signal measures.

Figure 1:
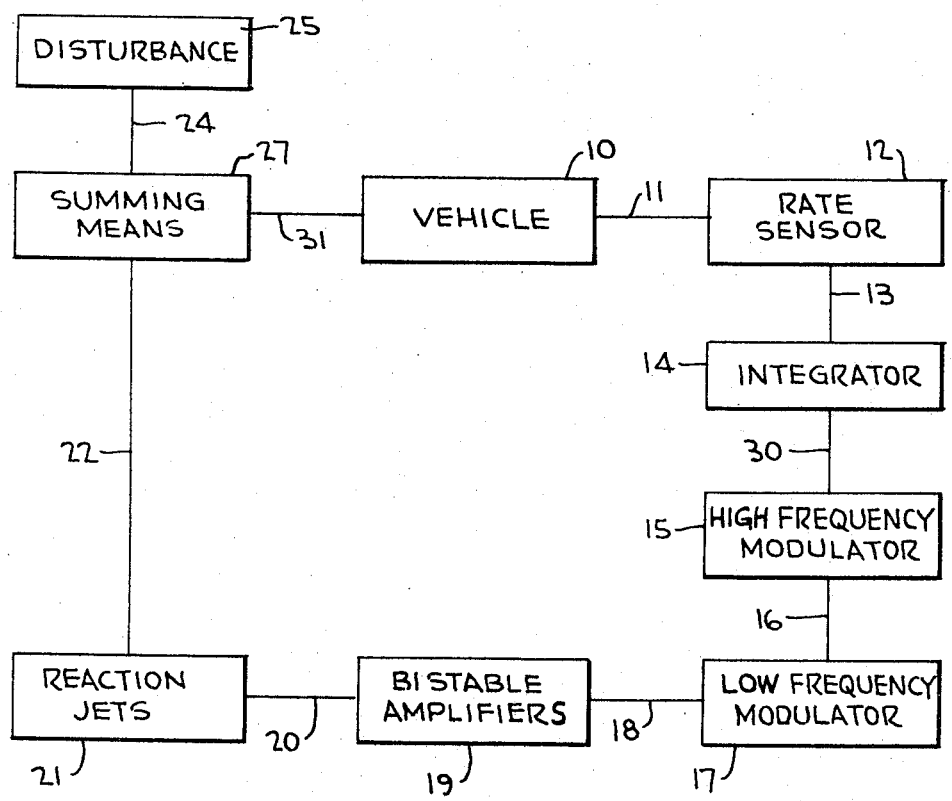
Figure 2:
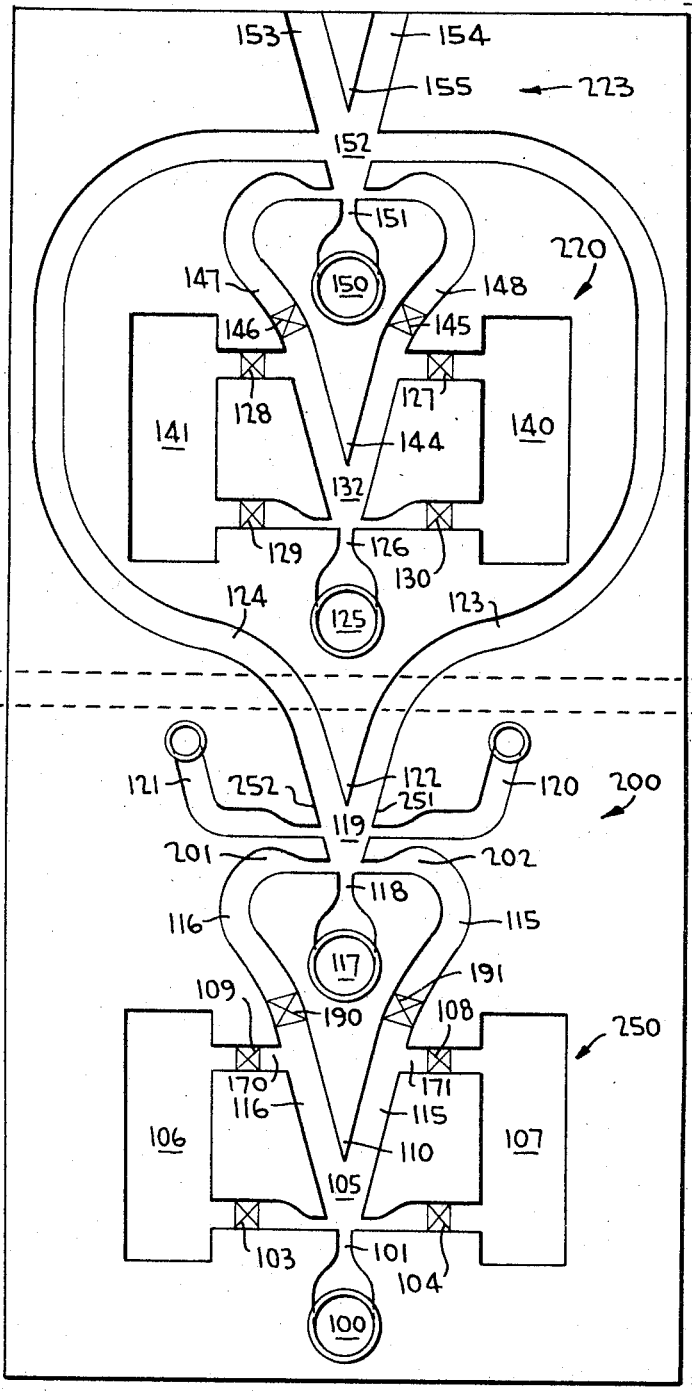

Other objects and aspects of the present invention will become apparent upon consideration of the following description, especially when taken in conjunction with the accompanying drawings wherein:

FIGURE 1 is a block diagram of an aircraft control system in accordance with the present invention, and FIGURE 2 is a schematic representation of a high gain amplifier means used in the present invention.

In FIGURE 1 all the elements are shown in block diagram form for purposes of illustration and all the elements are conventional except when specifically stated to the contrary. While I have shown the control system as being outside an aircraft vehicle 10, it is to be understood that this is for illustrative purposes only and normally the control system will be within aircraft 10. A rate sensor 12, preferably one of the well known vortex rate sensors, is shown by a line 11 detecting an angular rate applied to aircraft vehicle 10. If the rate sensor 12 is to measure the rate of roll applied to vehicle 10 it would be placed transverse to the axis of the vehicle. If the rate sensor were to detect the pitch or yaw of the vehicle it would be placed in vehicle 10 in accordance with well known principles. If a control system were desired that would be capabe of detecting and eliminating simultaneously pitch, roll and yaw, three control systems such as shown in FIGURE 1 would be necessary. An integrator 14 is connected by line 13 to rate sensor 12. Integrator 14 could be any of the commercial no-moving-part integrators now available or it could be the type described in "Low Pressure Amplifier and Analog Computer" by Thomas J. Lechner of the Johnson Service Company and published April 1966, under Contract No. DA-49-186-AMC-126(D) by Harry Diamond Laboratories, U.S. Army Materiel Command, Washington, D.C. (pages 42-49 are pertinent to a no-moving-part fluid integrator). Line 30 connects the output of integrator 14 to a pure fluid high frequency modulator 15 (which will be later described in more detail along with low frequency modulator 17). Line 16 connects the output of high frequency modulator 15 to a low frequency modulator 17. Line 18 connects the low frequency modulator 17 to a series of cascaded bistable amplifiers 19 which by line 20 communicates with reaction jets 21. Reaction jets 21 are positioned in vehicle 10 to correct the particular disturbance rate sensor 12 is detecting. If rate sensor 12 is detecting roll the reaction jets will be placed to apply a thrust to vehicle 10 to eliminate any roll the vehicle is being subjected to. If it is desired to simultaneously correct the pitch, roll and yaw of vehicle 10, three sets of reaction jets would be needed appropriately positioned in vehicle 10 along with three control systems. A line 22 shows reaction jets 21 being connected to summing means 27, and by a line 31, being applied to vehicle 10 to counteract disturbance 25. Disturbance 25, which can take the form of either pitch, roll or yaw, is shown being applied to vehicle 10 by line 24, summing means 27 and line 31.

In FIGURE 2 high frequency modulator 15 is shown including a relaxation oscillator 250 and a digital or bistable amplifier 200. A pressure source 100 by a nozzle 101 directs pressure into interaction chamber 105 of oscillator 250. Positioned downstream of nozzle 101 is a splitter 110 which serves to define a left output passage 116 housing a variable resistor 190 and a right output passage 115 housing a variable resistor 191. A left feedback channel 170 includes a variable resistance 109, a left fluid capacitance 106 and a second variable resistance 103. A right feedback channel includes a first variable resistance 108, a fluid capacitance 107 and a second variable resistance 104. So far what I have described constitutes a normal relaxation oscillator whose frequency can be determined by adjusting resistances 103 and 104. Amplifier 200 is coupled to the output conduits of the relaxation oscillator by having left output passage 116 communicate with left control 201 of amplifier 200 while right output passage 115 communicates with a right control 202 of digital amplifier 200. A power source 117, preferably equal to source 100, supplies the power for amplifier 200 by means of a power nozzle 118 and an interaction chamber 119. A secondary left control 121 and a secondary right control 120 communicate with interaction chamber 119. A splitter 122 serves to define a left output passage 124 and a right output passage 123 which lead to a low frequency modulator 17. Low frequency modulator 17 includes a relaxation type oscillator 220, which is identical to relaxation oscillator 250, and a digital or bistable amplifier 223. Relaxation oscillator 220 has a left output passage 147 which includes a variable resistor 146 and serves as the left control of an amplifier 223. Right output passage 148 includes variable resistor 145 and serves as the right control of amplifier 223 which has a source of pressure 150 which, by power nozzle 151, directs fluid into an interaction chamber 152. A splitter 155 serves to define a left amplifier output 153 and a right amplifier output 154.

It is desired that pressure sources 125 and 150 be equal in low frequency modulator 17 as should pressure sources 100 and 117 be equal in the high frequency modulator. Having these pressures equal will tend to reduce frequency fluctuations due to pressure. It is also desirable that the pressure sources applied to the low and high frequency modulators be equal to eliminate any fluctuations in the system due to pressure variations in each modulator. Oscillator 250 is tuned to a relatively high frequency (200–300 c.p.s.) by means of variable resistances 103 and 104. This will produce an oscillating output in output passages 116 and 115 which serve as the controls of bistable amplifier 200. The oscillating fluid used to control amplifier 200 will produce an oscillating output from the amplifier to passages 124 and 123. If a signal is applied to secondary control 121, fluid from amplifier 200 will still oscillate but passage 123 will receive a positive pulsed pressure having a minimum value above zero. If no signal were applied to secondary control 121 the fluid from nozzle 118 would oscillate from left sidewall 252 to a right sidewall 251 with equal pressure pulses directed to output passages 123 and 124. A signal from 121 will bias the fluid from nozzle 118 to right sidewall 251 with the result that the fluid will oscillate from right sidewall 251 to a position short of left sidewall 252. This will result in a continuous pressure pulse having a minimum value above zero in passage 123 and an alternating (about a zero value) with a lower mean value than passage 123, pulse in passage 124. Oscillator 220 will direct alternating equal pulses to amplifier 223 which will oscillate fluid from power nozzle 151 to output passages 153 and 154. Oscillator 220 is tuned to a low frequency (60–100 c.p.s.) by varying resistances 129 and 130. If the pressure pulses in passages 123 and 124 were equal, equal pulses would be directed out passages 153 and 154 of amplifier 223. If the pressure pulse in passage 123 is pulsed about a positive value above zero while the pressure in passage 124 is pulsed about a zero value the output in passage 153 will be pulsed about a positive value above zero while the output in passage 154 will be pulsed about a zero value. It can be seen that if a stronger signal is applied to secondary control 121 a more positive pulse will be received in passage 123 resulting in a more positive pulse in passage 153. Thus it can be seen that by varying the pressure in secondary controls 121 and 120 a proportional pulsed output is obtainable in the output passages of bistable amplifier 223. Using the system as shown in FIGURE 2 and applying a signal at secondary controls 121 and 120, a proportional gain of over one-hundred has been obtained in output passages 153 and 154. It is obvious that if no signals were applied to secondary controls 120 and 121 the output in passages 153 and 154 would both be equal to each other and pulse about zero value. When the system of FIGURE 2 is used in FIGURE 1 the output of integrator 14 is used as the signal to the secondary controls of amplifier 200.

Assuming for purposes of illustration that rate sensor 12 is set to detect roll, and reaction jets 21 are set in vehicle 10 to effect vehicle roll, a signal will be produced by rate sensor 12 which is indicative of the angular rate of the roll applied to vehicle 10. The signal will be transferred to integrator 14 which will integrate the angular rate it receives producing a signal indicative of the angular displacement aircraft vehicle 10 is subjected to. As previously explained high frequency modulator 15 and low frequency modulator 17 will amplify the signal. The output of low frequency modulator 17 will be directed to a series of staged bistable amplifiers 19. Each bistable amplifier stage will amplify the signal it receives from the preceding stage and the last bistable amplifier should preferably be supersonic. The last bistable amplifier will controll the direction of reaction jets 21 as described in "A Digital-Proportional Fluid Amplifier for a Missile Control System" by Carl J. Campagnuolo and Leonard M. Sierack in the "Proceedings of the Fluid Amplification Symposium," volume III, of the Harry Diamond Laboratories published Oct. 26, 1965.

While I have described how my system can be used to correct roll it is obvious that if desired a plurality of systems could be used to simultaneously correct pitch, roll and yaw.

It will be apparent that the embodiments shown are only exemplary and that various modifications can be made in construction and arrangement within the scope of the invention as defined in the appended claims.

I claim as my invention:

1. In an airborne vehicle a control system for correcting spurious changes in flight direction requiring no moving parts or electronic components, comprising:
   (a) means to detect the rate of a disturbance applied to said airborne vehicle and to provide a first fluid signal indicative of said rate;
   (b) a fluidic integrator means having no moving parts, adapted to receive said first fluid signal, for producing a second fluid signal which is the integral of said first fluid signal;
   (c) first means, adapted to receive said second fluid signal, for generating a high frequency fluid signal and for modulating said high frequency fluid signal with said second fluid signal;
   (d) second means, adapted to receive said modulated high frequency signal, for generating a low frequency fluid signal and for modulating said low frequency fluid signal with said modulated high frequency signal;
   (e) a fluid amplifying means adapted to receive said modulated low frequency fluid signal and yield an amplified version of said modulated low frequency signal; and
   (f) means adapted to receive the amplified modulated low frequency signal for utilizing said amplified modulated low frequency signal to correct a change in flight path caused by said disturbance.

2. The control system of claim 1 in which said fluid amplifying means is a cascaded plurality of bistable fluid amplifiers.

3. A device according to claim 1 wherein said means to detect is a vortex rate sensor.

4. The control means of claim 1 in which said first means and said second means each comprise a fluidic relaxation oscillator and a bistable fluid amplifier, each having two output conduits with the output conduits of said relaxation oscillator being connected to opposing control conduits of said bistable amplifier, said first means and said second means being connected by connecting the output conduits of said bistable amplifier of said first means to opposing control conduits of said bistable amplifier of said second means, the output conduits of said bistable amplifier of said second means being adapted to transmit the output of said second means to said plurality of bistable amplifiers, and said bistable amplifier in said first means having an additional pair of control conduits adapted to receive said second fluid signal.

5. The control system of claim 1 in which said utilization means are reaction jets placed in said airborne vehicle.

References Cited

UNITED STATES PATENTS

| | | | |
|---|---|---|---|
| 3,117,593 | 1/1964 | Sowers | 137—81.5 |
| 3,254,864 | 6/1966 | Kent et al. | 244—78 |
| 3,172,624 | 3/1965 | Parker et al. | |
| 3,180,592 | 4/1965 | Jeye et al. | 244—78 |
| 3,223,101 | 12/1965 | Bowles | 137—81.5 |

OTHER REFERENCES

Space/Aeronautics: April 1964, pp. 125–129.

ANDREW H. FARRELL, *Primary Examiner.*

U.S. Cl. X.R.

137—81.5